(12) United States Patent
Clark et al.

(10) Patent No.: US 7,575,215 B1
(45) Date of Patent: Aug. 18, 2009

(54) SUPPORT BASE FOR USE ON DECKED SURFACES

(76) Inventors: Dean Clark, P.O. Box 502, Riverton, WY (US) 82501; Mark Johnston, P.O. Box 584, Casper, WY (US) 82603

( * ) Notice: Subject to any disclaimer, the term of this patent is extended or adjusted under 35 U.S.C. 154(b) by 200 days.

(21) Appl. No.: 11/034,135

(22) Filed: Jan. 11, 2005

(51) Int. Cl.
*F16M 13/00* (2006.01)
*A01K 97/10* (2006.01)

(52) U.S. Cl. .................... 248/519; 43/21.2; 248/222.11; 248/529; 248/539

(58) Field of Classification Search ................ 248/519, 248/539, 529, 518, 231.9, 222.11, 222.12, 248/222.13, 222.51, 507, 223.31; 114/230.1, 114/230.29, 218; 43/21.2; 410/116, 111
See application file for complete search history.

(56) References Cited

U.S. PATENT DOCUMENTS

| 2,688,289 | A |   | 9/1954 | Sterling |   |
|---|---|---|---|---|---|
| 3,381,925 | A | * | 5/1968 | Higuchi | ...................... 410/116 |
| 4,297,963 | A | * | 11/1981 | Beacom | .................. 114/230.29 |
| 4,582,287 | A |   | 4/1986 | DeLeary |   |
| 5,120,016 | A | * | 6/1992 | Dysarz | ........................ 248/539 |
| 5,685,517 | A | * | 11/1997 | Salibra | ........................ 248/519 |
| 5,690,042 | A |   | 11/1997 | Bentley |   |
| 5,813,163 | A | * | 9/1998 | Dysarz | ........................ 43/21.2 |
| 5,895,017 | A |   | 4/1999 | McMillan, Jr. |   |
| 5,961,091 | A |   | 10/1999 | Petryna et al. |   |
| 5,967,075 | A | * | 10/1999 | Johansen | .................. 114/230.1 |
| 6,497,067 | B1 | * | 12/2002 | King | ........................... 43/21.2 |
| 6,647,911 | B1 |   | 11/2003 | Soterbeck |   |
| 6,712,569 | B1 | * | 3/2004 | Wang et al. | .................. 410/111 |
| 6,745,529 | B2 |   | 6/2004 | Beltran |   |
| 6,955,330 | B1 | * | 10/2005 | Weiser et al. | ................ 248/529 |
| 2004/0056169 | A1 |   | 3/2004 | Harbaugh |   |

* cited by examiner

*Primary Examiner*—Amy J. Sterling
*Assistant Examiner*—Tan Le

(57) ABSTRACT

An anchoring device will cooperate with a slotted aperture in a planked surface, such as a deck or boat dock, is disclosed. An example of the invention includes an internal tube that is telescopically mounted within a hollow cylindrical external tube. A support flange that is mounted to the bottom of the internal tube at one end and to a support flange at the other end extends through the bottom of the external tube. A spring is mounted between the bottom of the internal tube and the bottom of the external tube, so that the spring may be compressed by sliding the internal tube into the external tube. The sliding of the internal tube into the external tube causes the support flange to extend, so that the planked surface may be gripped between the support flange and the bottom of the external tube.

8 Claims, 5 Drawing Sheets

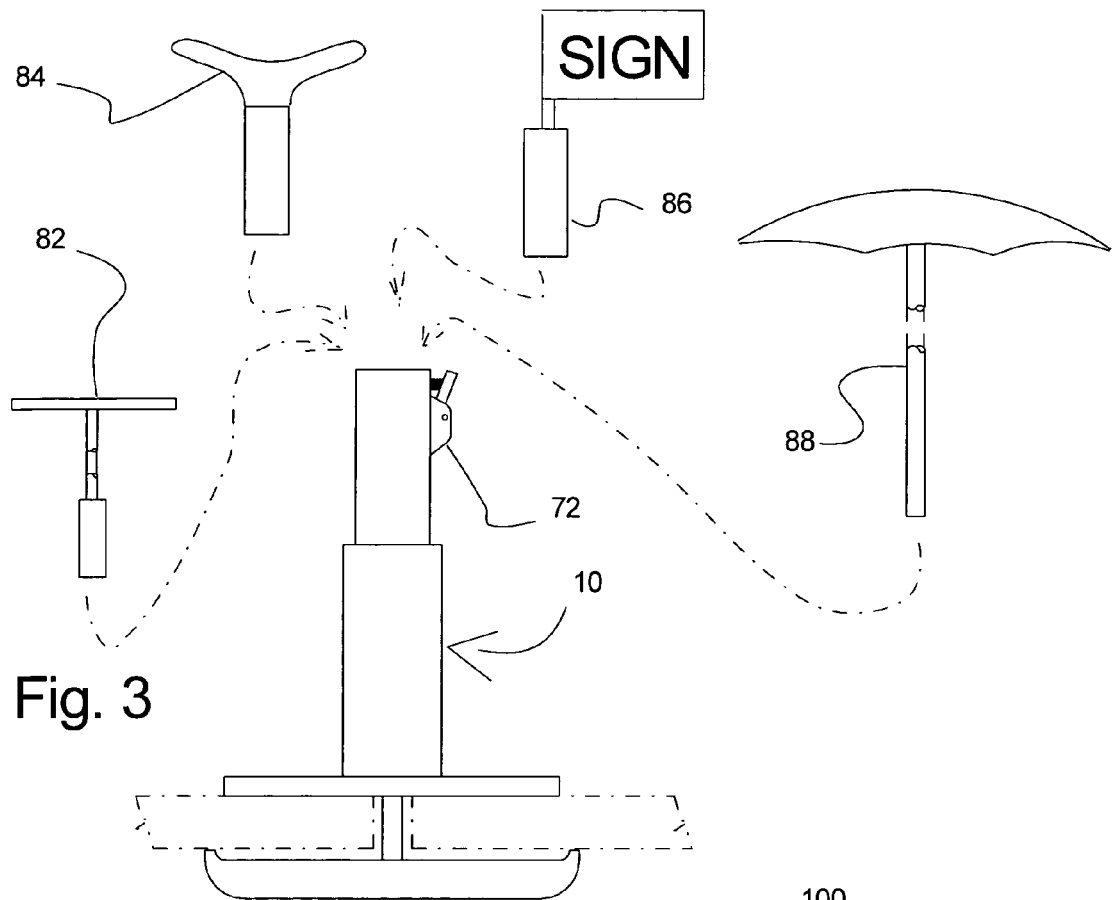
Fig. 3
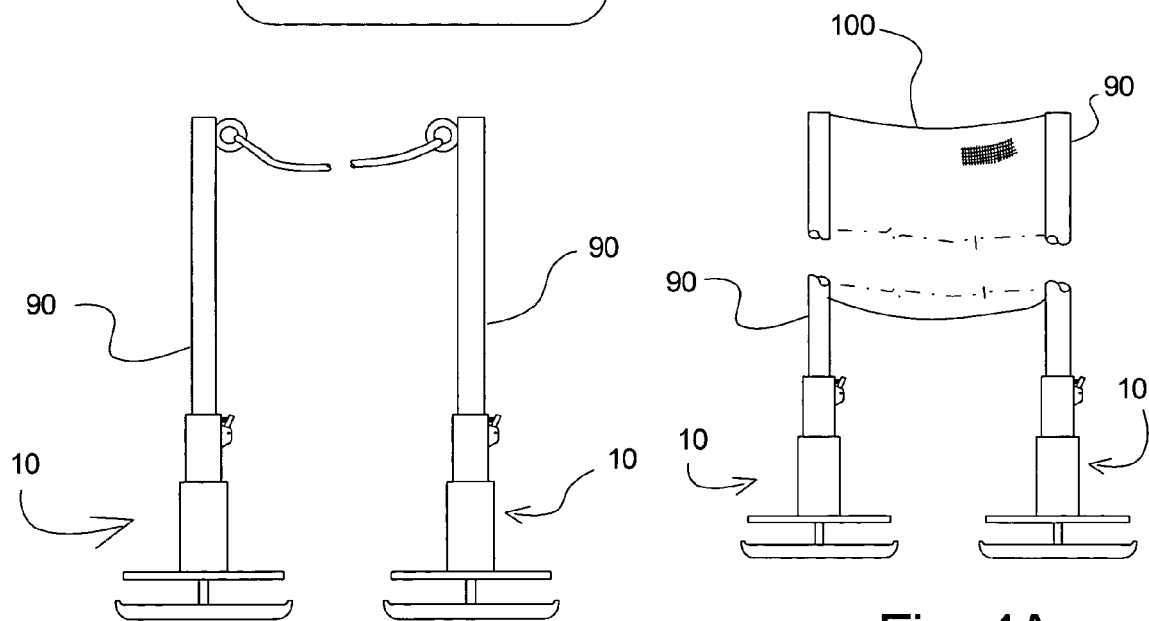
Fig. 4
Fig. 4A

SUPPORT BASE FOR USE ON DECKED SURFACES

BACKGROUND OF THE INVENTION (a) Field of the Invention

This invention generally relates to a support base that can be used to support various types of devices from a surface that includes gaps, such as the gaps formed by spaced apart decking boards. The support base includes a retention member that fits through the gaps and engages the backside of the surface. A spring-loaded engagement and support mechanism is provided for urging the retention member against the backside of the surface and for supporting an accessory from the support base.

(b) Discussion of Known Art

The need to anchor things to a support surface such as a patio deck, a boat dock, or the like is well understood. The problem often presents itself in the most inopportune times. For example, the need to provide a safe and secure attachment for a shade umbrella used with a patio table is clearly recognized when a sudden wind blows the umbrella over, together with the table and all of the food items that had been set on the table.

Other situations that call for anchoring devices frequently occur in boating. Docks typically provide fixed cleat locations. The dock's builder has determined the cleat locations, based on the builder's estimate on the size of boat that is likely to be anchored there. However, this estimate is very likely to be wrong. The lengths of the boats that are used are likely to vary from this estimate. Accordingly, the placement of the fixed cleat locations is likely to be non-optimal.

In yet other situations, there is a need to anchor or attach items such as fishing poles, chairs, railings and other devices to docks, decks, or other platforms that inherently include slotted openings or incorporate slotted openings to allow the attachment or support of these items.

There are known devices that take advantage of the slotted openings between the planks that are used to create the deck or dock surface to support useful items such as cleats, chairs and the like. One example of such a device is found in U.S. Pat. No. 5,120,016 to Dysarz, incorporated herein it its entirety by reference. The Dysarz device uses a "T-bar" that is fixed to a turning bar, which in turn cooperates with a threaded plug with external threads. The threaded plug cooperates with a tube with internal threads, and which cooperates with the threaded plug to move the T-bar along the tube in order to engage or disengage the lower portion or surface of the planks.

Another example of a known device is found in U.S. Pat. No. 5,813,163 to Dysarz. This example also uses an inverted "T-bar" that rides in a threaded plug that is moved along the tubular portion of a base member.

Other known devices include the device taught in U.S. Pat. No. 5,895,017 to McMillan, Jr., which also uses threaded sections to tighten flange portions against the lower portions or surfaces of the planks.

An important limitation of devices that use threaded sections to tighten the flanged portions of known anchoring devices is that the turning of the mating threaded sections can be tedious and even difficult. Furthermore, a well-known problem with threaded joints is that they can work themselves free through vibrations. Additionally, if the materials used to build these devices is susceptible to corrosion, then the extended use of these devices on docks can lead to the seizing of the mating threaded surfaces, making the device unusable.

Accordingly, there remains a need for a system or device that can be used through slotted openings, such as the openings created by the planking on decks or docks, to temporarily support items from the slotted opening.

SUMMARY

It has been discovered that the problems left unanswered by known art can be solved by providing a removable anchoring device for retaining objects from a planked structure containing a slotted aperture. The anchoring device will cooperate with the slotted aperture to gain access to a lower surface that lies below the planked structure, the anchoring device including:

An internal tube, the internal tube having a top, a bottom, and an aperture that extends from the top towards the bottom. The bottom also having a bottom wall that closes off at least part of the bottom of the internal tube;

A hollow cylindrical external tube of a length, the cylindrical external tube further having a top, a bottom, and an aperture that extends from the top towards the bottom. The external tube bottom extending across the aperture of the cylindrical external tube, the internal tube nesting within the cylindrical external tube in a telescopic manner, the hollow cylindrical external tube further comprising a support strut that is adapted to extend from the cylindrical external tube to the to the planked structure, so that the strut provides support to the cylindrical external tube from the planked structure;

a support flange, the support flange being connected to the bottom of internal tube by a rigid column that extends through the bottom of the external tube and the rigid column is fixed to the bottom of the internal tube, the support flange being of a flange length and a flange width, the flange width being smaller than the width of the slotted aperture, and the flange length being larger than the width of the slotted aperture;

a spring, the spring being positioned between bottom of said frame tube and the an external tube bottom, so that insertion of the support flange through the slotted aperture by aligning the flange length of the support flange with the slotted aperture and then turning the support flange by turning the hollow internal tube allows the spring to bias the support flange against the lower surface of the panel.

It is contemplated that the internal tube will accept items that are to be supported by the anchoring device. Additionally, it is contemplated that the internal tube will include an attachment device that will be used to help retain items in the internal tube. Accordingly, it is contemplated that the disclosed invention may be used to support or retain a wide variety of items from a support structure that has at least one slotted opening therethrough. Examples of structures that typically include such a slotted opening include decks or docks that are constructed It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which:

FIG. 3 illustrates examples of accessories that can be supported with the disclosed invention.

FIG. 4 illustrates the use of the invention to section off an area, or to form a barrier.

FIG. 4A illustrates the use of the disclosed invention to support a screen or similar device.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
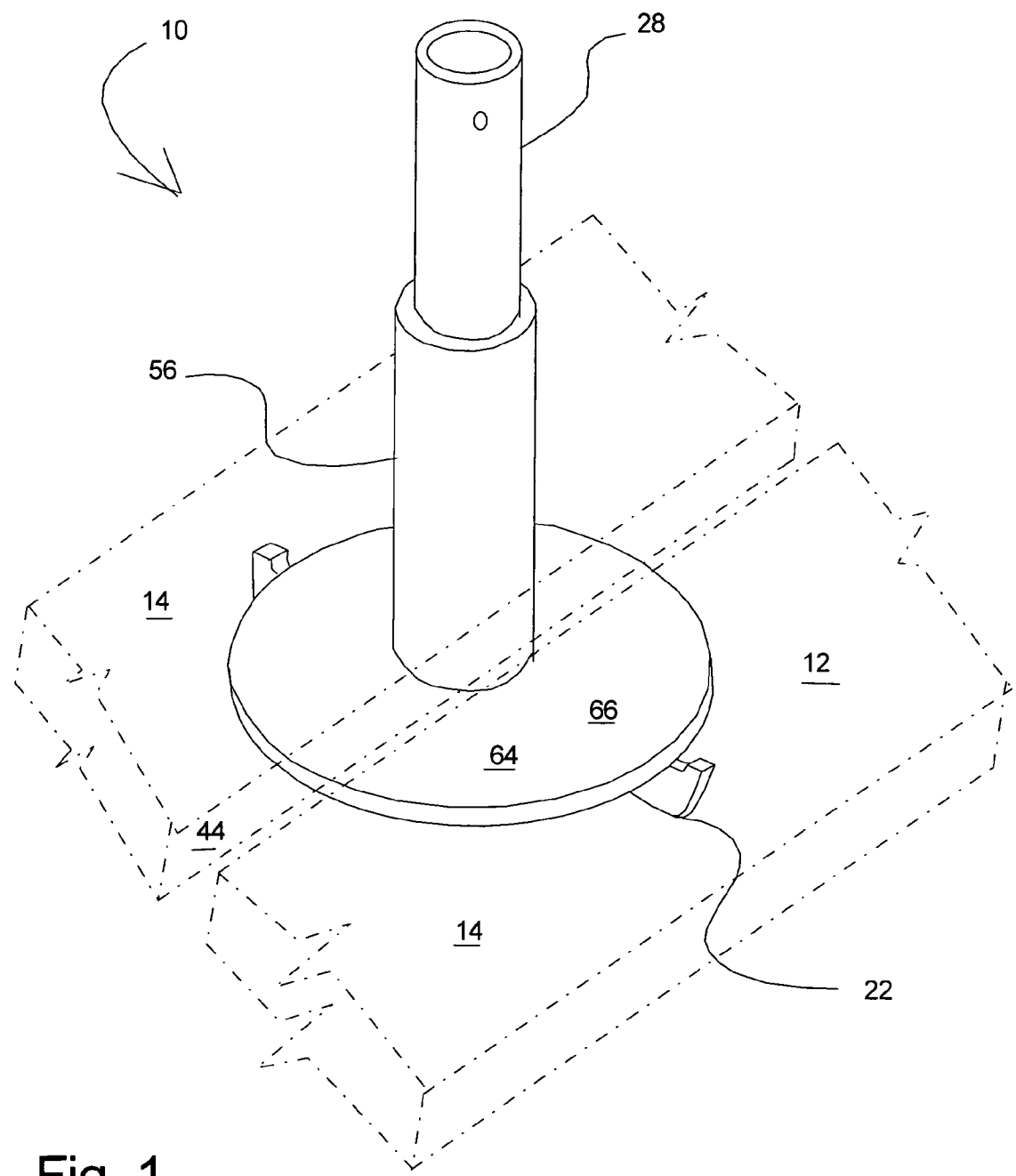
FIG. 1 is a perspective view of an embodiment of the invention in use over a decked surface.

Turning now to FIG. 1 where an example of a removable anchoring device 10 including the inventive aspects disclosed herein has been illustrated while in use on a decked surface 12. The term decked surface, as used herein refers to slotted surfaces and particularly to slotted surfaces formed from planks 14, such as wooden docks or patio decks. These planks 14 include an upper surface 16 and a lower surface 18 that are separated by a distance 20.

Figure 2:
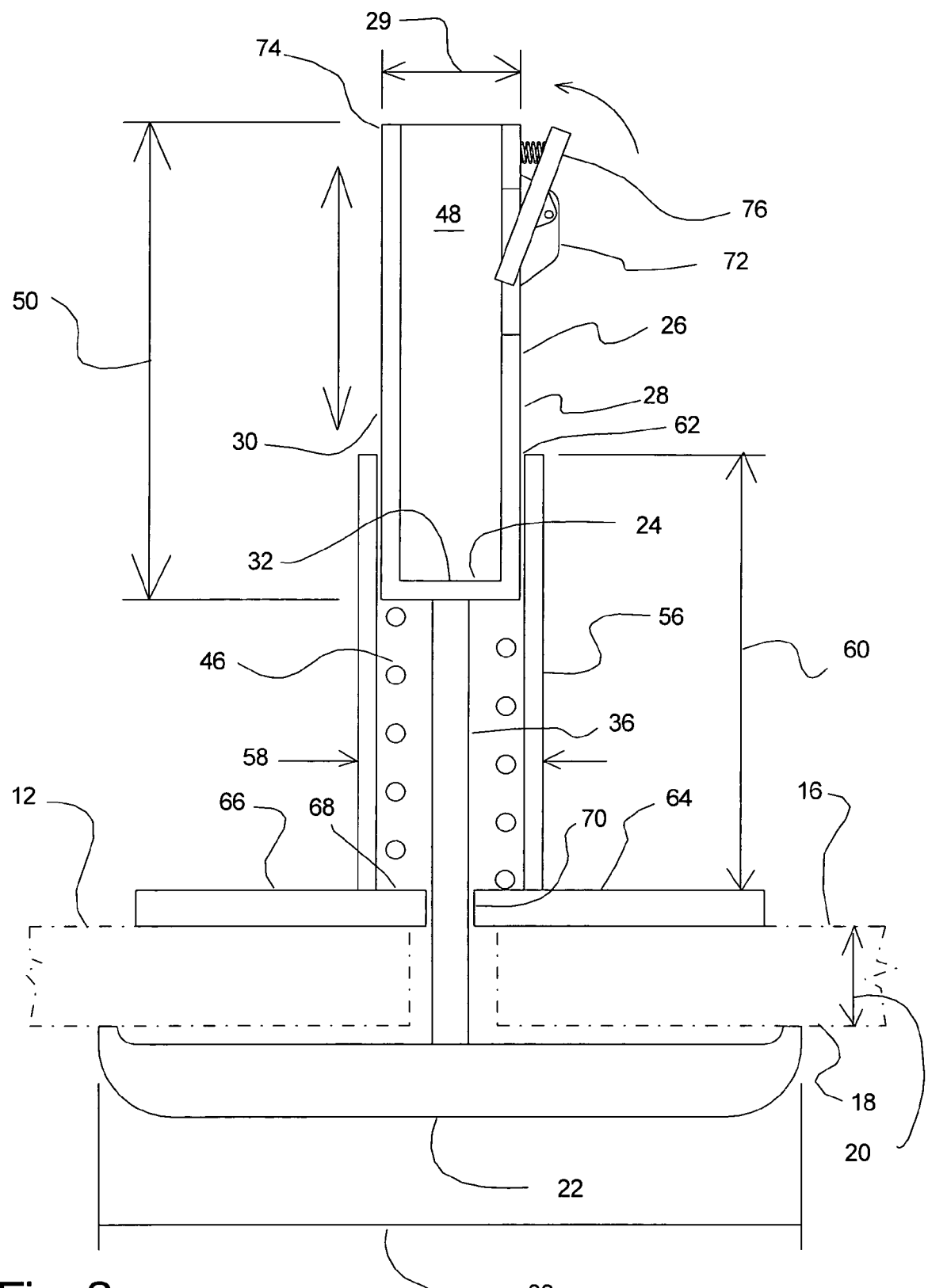
FIG. 2 is a sectional view of a preferred example of the invention.
Figure 5:
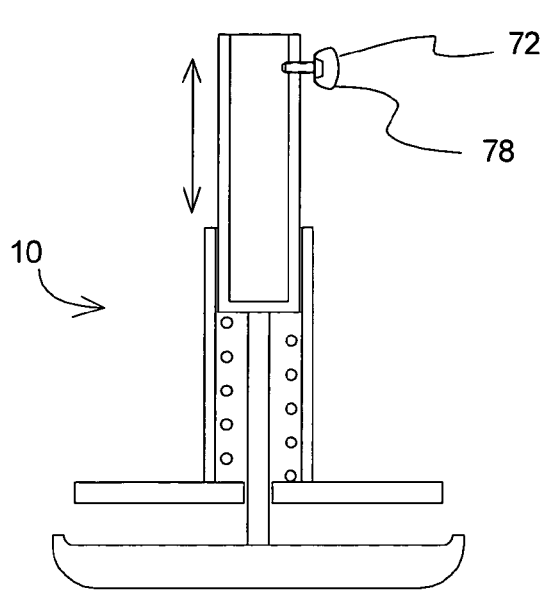
FIG. 5 illustrates an example of a support device that serves to retain items placed within the internal frame or hollow internal cylinder.

As illustrated in FIG. 2, the disclosed invention cooperates with the upper surface 16 and the lower surface 18 of the decked surface, which lies below or behind the upper surface 16. The disclosed invention clamps these two surfaces between a support flange 22 and a bottom 24 of the anchoring device 10.

According to a preferred example of the invention, the anchoring device 10 includes a support frame 26, which in the illustrated example is an internal tube 28 of a first diameter 29. The support frame 26 will also have sides 30 and a bottom 32. In a preferred example the sides 30 and the bottom 30 are both part of the internal tube 28, as shown in FIG. 2.

FIG. 2 also shows that it is contemplated that the disclosed invention 10 will use the support flange 22 that is connected to the bottom 32 of the support frame, or internal tube 28, by a rigid column 36. It is further contemplated that the support flange 22 will be of a flange length 38 and a flange width 40, illustrated in FIG. 8B. The flange width 40 should be smaller than the width 42 of the slotted aperture 44 that is formed between the planks 14 of the decked surface 12. Additionally, it is contemplated that the flange length 38 will be larger than the width 42 of the slotted aperture 44. Thus, once the support flange 22 is inserted through the slotted aperture 44 and turned at an angle to the slotted aperture 44, the support flange 22 will be able to engage the lower surface 18 of the planks 14, or decked surface.

As can be understood from FIG. 2, the support flange 22 will be urged against the lower surface 18 of the planks 14 by a spring 46. The spring 46 is positioned between the support flange 22 and the bottom 32 of the support frame 26. In the illustrated example, the bottom 32 that extends across the aperture 48 in the internal tube 28. Thus, as illustrated in FIGS. 1 and 2, the insertion of the support flange 22 through the slotted aperture by aligning the length of the support flange 22 with the slotted aperture 44 and then pushing the internal tube 28 down, against the spring 46, and then turning the support flange 22 allows the spring 46 to bias the support flange 22 against the lower surface 18 of the panel or planks 14 once the internal tube 28 is released.

It is important to note that while it is contemplated that the disclosed invention may be used through the slotted aperture provided by the spacing of planks 14 on a dock or deck, it is also contemplated that the disclosed invention may be used with a track or similar device that can provide the slotted aperture, upper and lower surfaces that cooperate with the support flange 22 that is held against the lower surface by the force of the spring 46.

FIG. 2 also illustrates that it is contemplated that the internal tube 28 will be of a length 50, and that the aperture 48 of the internal tube 28 will extend along most of the length 50 of the internal tube 28. Additionally, it is contemplated that the aperture 48 of the internal tube 28 will include sides 30 and an internal tube bottom 32 that extends across the aperture 48 of the internal tube 28.

The embodiment illustrated in FIG. 2 shows that is contemplated that the spring 46 and the internal tube 28 will fit into a hollow cylindrical external tube 56, which will be of a second diameter 58 and a length 60. The external tube 56 will also include an aperture 62 that extends along most of the length 60 of the external tube 56 and terminates in an external tube bottom 64 that extends across the aperture 62 of the external tube 56.

As further illustrated in FIG. 2, the internal tube 28 will nest in a telescopic manner within the aperture 62 of the external tube 56. Additionally, the external tube 56 will also include a support strut 64 that is adapted to extend from the external tube 56 to the to the planked structure, or decked surface 12 to provide lateral support to the anchoring device 10. In the example illustrated in FIG. 2, the support strut 64 is simply a rigid skirt 66 that extends around the external tube 56. However, it is contemplated that this support strut 64 may be formed from a gusset or a single rod that extends from the external tube 56 to provide lateral support to the external tube 56.

FIG. 2 also illustrates that according to a preferred embodiment the spring 46 is positioned between bottom of the internal tube 28 and an external tube bottom 68. The external tube bottom 68 being attached to the external tube 56. This arrangement allows the compression of the spring 46 between the internal tube bottom 28 and the external tube bottom 68. This arrangement also has the rigid column 36 that extends from the internal tube bottom 28 through a bottom aperture 70 located through the external tube bottom 68, which allows the rigid column 36 to slide through the external tube bottom 28.

As shown on FIG. 2, the telescopic movement of the internal tube 28 into the aperture of the external tube 68 will cause the compression of the spring 46, and the extension of the rigid column 36 from the external tube bottom 68. This extension will allow the insertion of the support flange 22 through the slotted aperture 44 by aligning the support flange length 38 with the slotted aperture 44. Then, once the support flange 22 extends below the lower surface 18 of the decked surface 12, the support flange 22 may be turned so that it crosses the slotted aperture 44 and is biased by the spring 48 to engage the lower surface 18 upon release of the internal tube 28.

FIG. 2 illustrates that it is contemplated that the spring 46 will be a helical spring mounted in a parallel fashion to the rigid column 36. The spring 46 may be mounted next to the rigid column 36, but it is preferred that the spring 46 will be mounted around the rigid column 36. Still further, it is contemplated that the spring 46 may be mounted externally, parallel to the telescoping internal tube 28 and external tube 56, but this kind arrangement would require the placement of an external collar or similar connector on the internal tube 28 and would leave the spring exposed, opening the possibility of pinching or entangling things. Accordingly, an external spring is not favored.

Figure 6:
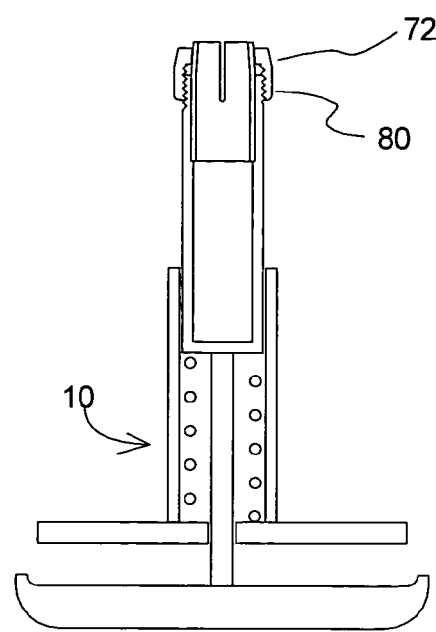
FIG. 6 illustrates another example of a support device that serves to retain items placed within the internal frame or hollow internal cylinder.

FIGS. 2 and 5-7 illustrate that it is contemplated that a support device 72 or engagement device may be incorporated into the first end 74 of the internal tube 28. According to one example, illustrated in FIGS. 2 and 7, this support device 72 includes a spring-loaded lever 76 that engages items inserted into the frame tube. Other examples of support devices 72 that are used to retain items within the internal tube 28 include thumbscrews 78, illustrated in FIG. 5, or collets 80, as illustrated in FIG. 6. However any other mechanism that wedges or prevents items from falling out of the aperture 48 in the internal tube 28. For example a screw or a nail may be protrude into the aperture 48 from the bottom 24 of the internal tube 28.

Figure 7:
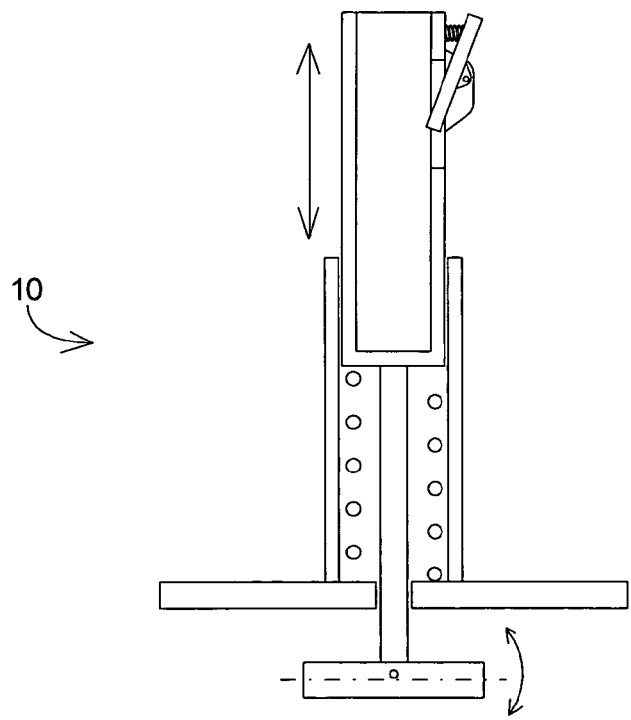
FIG. 7 illustrates another example of a support device that serves to retain items placed within the internal frame or hollow internal cylinder.

FIG. 7 illustrates that it is also contemplated that the support flange 22 may be pinned to the rigid column 36, allowing the support flange to pivot along the rigid column 36. This would allow the insertion of the support flange 22 through apertures of any shape, rather than just slotted apertures.

Turning now to FIGS. 3 and 4 it will be understood that the disclosed invention can be used to support a large variety of items from the a decked or similar surface. For example, a table 82, a mooring cleat 84 (which may actually be permanently attached to the internal tube 28, and thus being a part of the internal tube 28), a flag 86 or sign, as well as a shade umbrella 88, bench or stool. It is important to note that it is contemplated that an adaptor may be used if the diameter or size of the support for the table 83, flag 86, shade umbrella 88, screen 100, or whatever other item is being supported from the anchoring device 10 is too small to be engaged by the support device 72, or too large to fit into the internal tube 28 or frame. The adaptor may be a collar, shim, extension or any other device that will fit into the internal tube 28 or frame and provide sufficient area or material to allow secure retention in the internal tube 28 or frame.

Still further, FIG. 4 illustrates that the disclosed invention may be used to support posts 90 that cordon off an area or support handrails or similar items. An example of another item that may be supported using the disclosed system is a wind-block or shade mesh 100, illustrated in FIG. 4A. The mesh 100 may be positioned next to a table or chaise in order to block the wind and some of the sun, while still allowing one to see the surrounding areas.

Figure 8A:
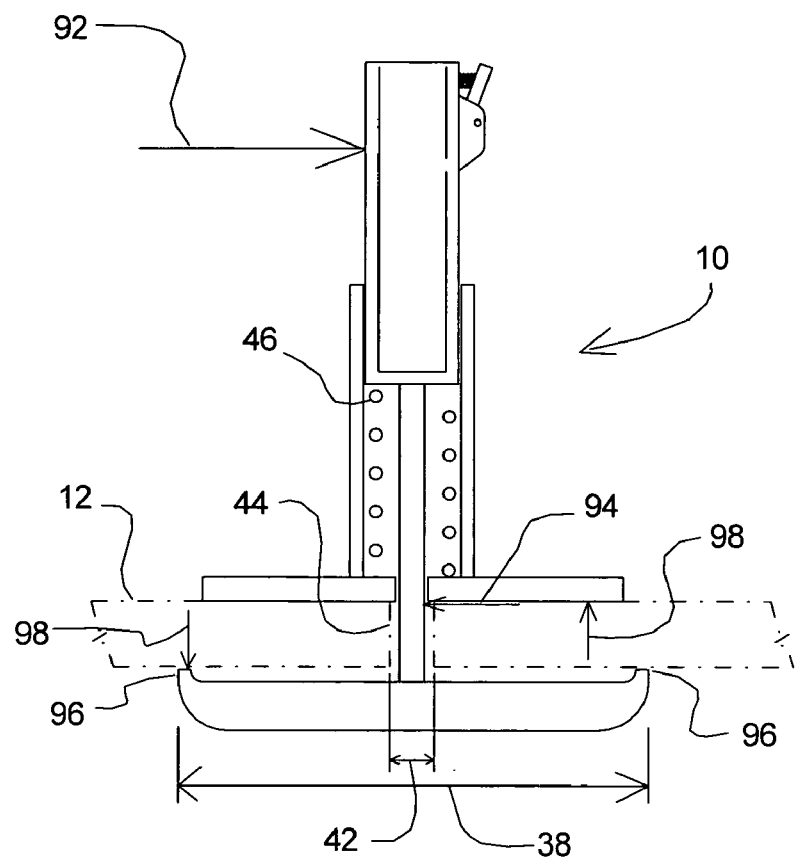
FIG. 8A illustrates incident forces and reaction forces acting on the disclosed invention during operation.
Figure 8B:
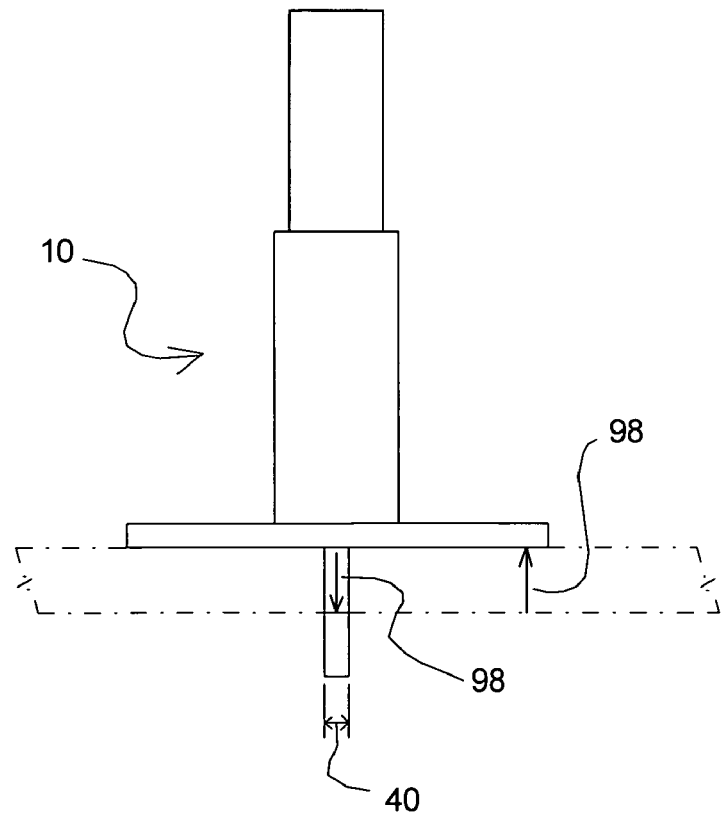
FIG. 8B illustrates other incident forces and reaction forces acting on the disclosed invention during operation.

The superior support strength achievable with the disclosed invention can be understood by examining FIGS. 8A and 8B. These illustrations show that a side force 92 in a direction that is generally parallel to the decked surface 12 will be reacted by a base force 94 along the support strut 64 or rigid skirt 66 and against the rigid column 36 (these forces may be a shear load against the support strut or rigid skirt and a bearing force against the side of the rigid column 36). Additionally a moment couple consisting of vertical forces 98 between the support strut 64 or rigid skirt 66 and the ends 96 of the support flange 26 will be react any bending produced by the side force 92. The close fit of the rigid column 36 through the bottom aperture 70 and the fixed attachment of the rigid column to the bottom 32 of the inner tube will tend to allow more load transfer to the strut 64, rigid skirt 66 as well as the rigid column 36, reducing the overall bending moment that needs to be reacted at the ends of the support flange 26.

It can be appreciated that the above-described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A removable anchoring system for retaining objects, the anchoring system comprising:
   a panel having a slotted aperture, the slotted aperture being of a width and extending from an upper surface of the panel to a lower surface that lies behind the upper surface, the lower surface extending away from the slotted aperture;
   a support frame, the support frame having sides and a bottom, a frame tube of a first diameter and a cylindrical external tube of a second diameter, the frame tube nesting in a telescopic manner within the external tube and having a spring-loaded lever adapted for engaging an item inserted into the frame tube;
   a support flange, the support flange being connected to the bottom of said support frame by a rigid column, the support flange being of a flange length and a flange width, the flange width being smaller than the width of the slotted aperture, and the flange length being larger than the width of the slotted aperture;
   a spring, the spring being larger than the width of the slotted aperture, so that the spring cannot pass completely through the slotted aperture, the spring being positioned between said support flange and the bottoms of said support frame, so that insertion of the support flange through the slotted aperture by aligning the length of the support flange with the slotted aperture and then turning the support flange allows the spring to bias the support flange against the lower surface of the panel.

2. A removable anchoring system for retaining objects, the anchoring system comprising:
   a panel having a slotted aperture, the slotted aperture being of a width and extending from an upper surface of the panel to a lower surface that lies behind the upper surface, the lower surface extending away from the slotted aperture;
   a hollow cylindrical internal tube of a length, the internal tube having an aperture that extends along most of the length of the internal tube, the aperture of the internal tube having sides and a bottom that extends across the aperture of the internal tube and a support device adapted for retaining objects from the internal tube, the support device being mounted from the sides of the internal tube and having a spring-loaded lever adapted for engaging an item inserted into the frame tube;

a hollow cylindrical external tube of a second diameter and a length, the external tube further having an aperture that extends along most of the length of the external tube and terminates in an external tube bottom that extends across the aperture of the external tube, the internal tube nesting in a telescopic manner within the external tube;

a support flange, the support flange being connected to the bottom of said frame tube by a rigid column that extends through the external tube bottom and is fixed to the bottom of the internal tube, the support flange being of a flange length and a flange width, the flange width being smaller than the width of the slotted aperture, and the flange length being larger than the width of the slotted aperture;

a spring, the spring being positioned between bottom of said frame tube and the an external tube bottom, so that insertion of the support flange through the slotted aperture by aligning the length of the support flange with the slotted aperture and then turning the support flange by turning the hollow internal tube allows the spring to bias the support flange against the lower surface of the panel.

3. An anchoring system according to claim 2 wherein said spring is a helical spring mounted along said rigid column.

4. An anchoring system according to claim 2 said spring is mounted next to said rigid column.

5. A removable anchoring system adapted for retaining objects, the anchoring system comprising:

a planked structure containing a slotted aperture, the slotted aperture being of a width and extending from an upper surface of the planked structure to a lower surface of the planked structure that lies below the upper surface of the planked structure, the lower surface of the planked structure extending away from the slotted aperture;

a hollow internal cylindrical tube of a length, the internal tube having an aperture that extends along most of the length of the internal tube, the aperture of the internal tube having sides and a bottom that extends across the aperture of the internal tube and a support device adapted for retaining objects from the internal tube, the support device being mounted from the sides of the internal tube and having a spring-loaded lever adapted for engaging an item inserted into the frame tube;

a hollow cylindrical external tube of a second diameter and a length, the external tube further having an aperture that extends along most of the length of the external tube and terminates in an external tube bottom that extends across the aperture of the external tube, the internal tube nesting in a telescopic manner within the external tube, the hollow external tube further comprising a support strut that is adapted to extend from the external tube to the to the planked structure, so that the strut provides support to the hollow cylindrical internal and external tubes from the planked structure;

a support flange, the support flange being connected to the bottom of said frame tube by a rigid column that extends through the external tube bottom and is fixed to the bottom of the internal tube, the support flange being of a flange length and a flange width, the flange width being smaller than the width of the slotted aperture, and the flange length being larger than the width of the slotted aperture;

a spring, the spring being positioned between bottom of said frame tube and the an external tube bottom, so that insertion of the support flange through the slotted aperture by aligning the length of the support flange with the slotted aperture and then turning the support flange by turning the hollow internal tube allows the spring to bias the support flange against the lower surface of the panel.

6. An anchoring system according to claim 5 wherein said spring is a helical spring mounted along said rigid column.

7. An anchoring system according to claim 5 said spring is mounted next to said rigid column.

8. An anchoring system according to claim 5 wherein said hollow external tube further comprises an upper end and a lower end, the lower end having a support plate that extends from the external tube and provides support for the anchoring device against the upper surface of the planked structure.

* * * * *